(12) United States Patent
Lund

(10) Patent No.: US 7,535,836 B2
(45) Date of Patent: May 19, 2009

(54) METHOD AND SYSTEM TO PROVIDE WORD-LEVEL FLOW CONTROL USING SPARE LINK BANDWIDTH

(75) Inventor: Martin Lund, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 963 days.

(21) Appl. No.: 10/644,204

(22) Filed: Aug. 20, 2003

(65) Prior Publication Data

US 2004/0156317 A1 Aug. 12, 2004

Related U.S. Application Data

(63) Continuation-in-part of application No. 10/454,273, filed on Jun. 4, 2003, now Pat. No. 6,859,154, and a continuation-in-part of application No. 10/454,012, filed on Jun. 4, 2003, now Pat. No. 7,463,651.

(60) Provisional application No. 60/462,845, filed on Apr. 15, 2003, provisional application No. 60/448,703, filed on Feb. 18, 2003, provisional application No. 60/446,894, filed on Feb. 12, 2003.

(51) Int. Cl.
*H04J 1/16* (2006.01)
(52) U.S. Cl. .................. 370/230; 370/231; 370/235
(58) Field of Classification Search ............. 370/231, 370/235, 236, 276, 446, 465, 230, 296, 392, 370/352, 389, 241.1, 249, 413, 395.1, 242; 341/59, 58, 61; 710/107; 709/231, 232
See application file for complete search history.

(56) References Cited

U.S. PATENT DOCUMENTS

| 5,406,550 | A | * | 4/1995 | McTiffin ..................... 370/335 |
| 5,493,566 | A | * | 2/1996 | Ljungberg et al. .......... 370/231 |
| 5,559,963 | A | * | 9/1996 | Gregg et al. ................. 709/234 |
| 5,673,254 | A | * | 9/1997 | Crayford .................... 370/231 |
| 5,944,797 | A | * | 8/1999 | Gregg et al. ................. 709/237 |
| 6,108,736 | A | * | 8/2000 | Bell ........................... 710/107 |

(Continued)

FOREIGN PATENT DOCUMENTS

EP         0978968 A      2/2000

(Continued)

OTHER PUBLICATIONS

Feuser O et al, "On the Effects of the IEEE 802.3x Flow Control in Full-Duplex Ethernet LANs", Local Computer Networks, 1999, LCN '99 Conference on Lowell, MA, USA, Oct. 18-20, 1999, Los Alamitos, CA, USA, IEEE Computer Soc., USA, pp. 160-161, XP010358538 ISBN: 0-7695-0309-8.

*Primary Examiner*—Chi H Pham
*Assistant Examiner*—Alexander Boakye
(74) *Attorney, Agent, or Firm*—McAndrews, Held & Malloy, Ltd.

(57) ABSTRACT

Aspects of the invention utilize a secondary communication channel to conduct flow control at the word level. As a result, the overhead associated with flow control can be reduced, as well as the risk of buffer overflow. In one embodiment, embedded flow control information is encoded as reversed running disparity codes in each transmission lane. Additional control symbols may be coded by grouping a series of specially coded data words or inspecting a selected data word at regular intervals.

24 Claims, 8 Drawing Sheets

U.S. PATENT DOCUMENTS 6,198,413 B1 3/2001 Widmer
6,700,510 B1 * 3/2004 Kryzak et al. .................. 341/59
6,980,520 B1 * 12/2005 Erimli ........................ 370/236

FOREIGN PATENT DOCUMENTS

| | | |
|---|---|---|
| GB | 2016247 A | 0/1879 |
| GB | 2360666 A | 9/2001 |
| WO | 9952293 B1 | 10/1999 |

* cited by examiner

METHOD AND SYSTEM TO PROVIDE WORD-LEVEL FLOW CONTROL USING SPARE LINK BANDWIDTH

PRIOR APPLICATIONS UNDER 35 U.S.C. § 120

This application is a continuation-in-part of U.S. application Ser. No. 10/454,273 filed on Jun. 4, 2003 now U.S. Pat. No. 6,859,154 and a continuation-in-part of U.S. application Ser. No. 10/454,012 filed on Jun. 4, 2003 now U.S. Pat. No. 7,463,651.

PRIOR PROVISIONAL APPLICATIONS UNDER 35 U.S.C. § 119(e)

This application claims the benefit of the following U.S. Provisional Applications:

Provisional Application No. 60/462,845 filed on Apr. 15, 2003.

Provisional Application No. 60/446,894 filed on Feb. 12, 2003.

INCORPORATION BY REFERENCE

The complete subject matter of the following applications are hereby incorporated by reference:

U.S. patent application Ser. No. 10/454,273, filed on Jun. 5, 2003 and U.S. patent application Ser. No. 10/454,012 filed on Jun. 5, 2003.

FEDERAL SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Serial data communication between two link partners in a digital communication system is often accomplished according to the general configuration of FIG. 1. FIG. 1 shows a digital communication link 100 comprising a system #1 101 and a system #2 102 connected by a communication link infrastructure 103. The system #1 101 and the system #2 102 may include computer systems transmitting streams of serial data to each other over the communication link infrastructure 103. The communication link infrastructure 103 may comprise copper wire, optical fiber, or a wireless connection.

The system #1 101 and the system #2 102 each have a limit to the amount of data that may be buffered up during reception. At some point, the buffers in system #1 101 and/or system #2 102 may get filled up if data is being sent to the systems faster than the systems can empty out the buffers and process the data.

A concept called flow control is traditionally used to handle the problem of buffers getting filled up. In general, with flow control, if the buffer of the system #1 101 is getting filled up, the system #1 101 tells the system #2 102 to stop transmitting data for awhile until the system #1 101 can get caught up. The system #2 102 may respond in the same manner to the system #1 101 when the buffer of the system #2 102 is getting filled up.

In a modem-based system, a signal on a physical pin was typically used to indicate to another system a flow control status. For example, the signal on a physical pin between two systems may indicate "ready to send" or "not ready to send" conditions. Flow control status information is also typically sent between two systems as an additional frame that is part of the data stream. The additional frame contains the flow control status information that tells the other side of the communication link what to do (e.g., stop transmitting data for now).

However, when a system is in the process of transmitting a current frame of data, the system will continue to transmit that frame of data until the entire frame has been transmitted. A system does not typically stop in mid-stream of transmitting a frame of data. As a result, when a first system detects that its buffer is getting full, it may not be able to get the other system to stop transmitting right away because the other system may be in the middle of transmitting a long frame of data.

Also, with full duplex communication between two systems, if a first system detects that its buffer is filling up and the first system just started transmitting a long frame of data to a second system, the first system typically must wait until it is done transmitting the long frame of data before it can tell the second system to stop transmitting. As a result, systems typically need to have large buffers to accommodate such worst case scenarios.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method is provided for accomplishing word-level flow control in a communication system using a secondary communication channel. In an example of the method, word-level flow control is provided using a secondary communication channel. The method may be implemented on a bi-directional communications link between a first system and a second system.

A frame of data may be transmitted from the first system to the second system. While the frame is being transmitted, a secondary communications channel in the data being transmitted from the second system to the first system contains embedded flow control information. The first system may use that information to stop transmitting a data frame in response to an embedded stop transmission request, without waiting for the end of a frame. The stop transmission request may be embedded as a running disparity code that is deliberately coded with the opposite sign normally called for by the running disparity algorithm. The stop transmission data may be encoded in every coded word, at selected points within a frame. The embedded code may also be built from a predetermined sequence of words within a frame, for example, from every $10^{th}$ word or from a group of two or more words at regular intervals.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to flow control of data. In particular, certain embodiments of the present invention relate to providing word-level flow control in a communication system using a secondary communication channel.

Figure 1:
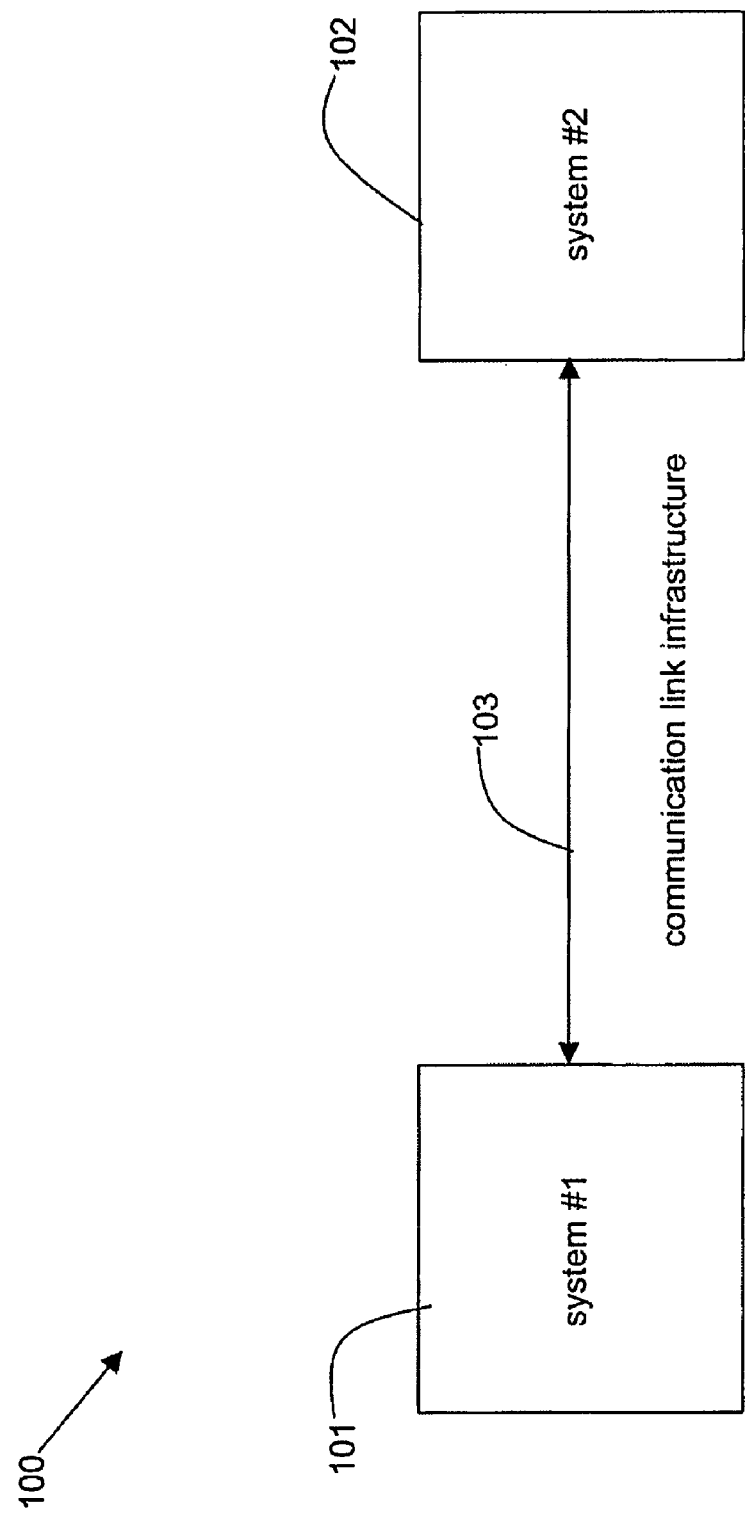
FIG. 1 is a diagram illustrating an embodiment of a current digital communication link.
Figure 2:
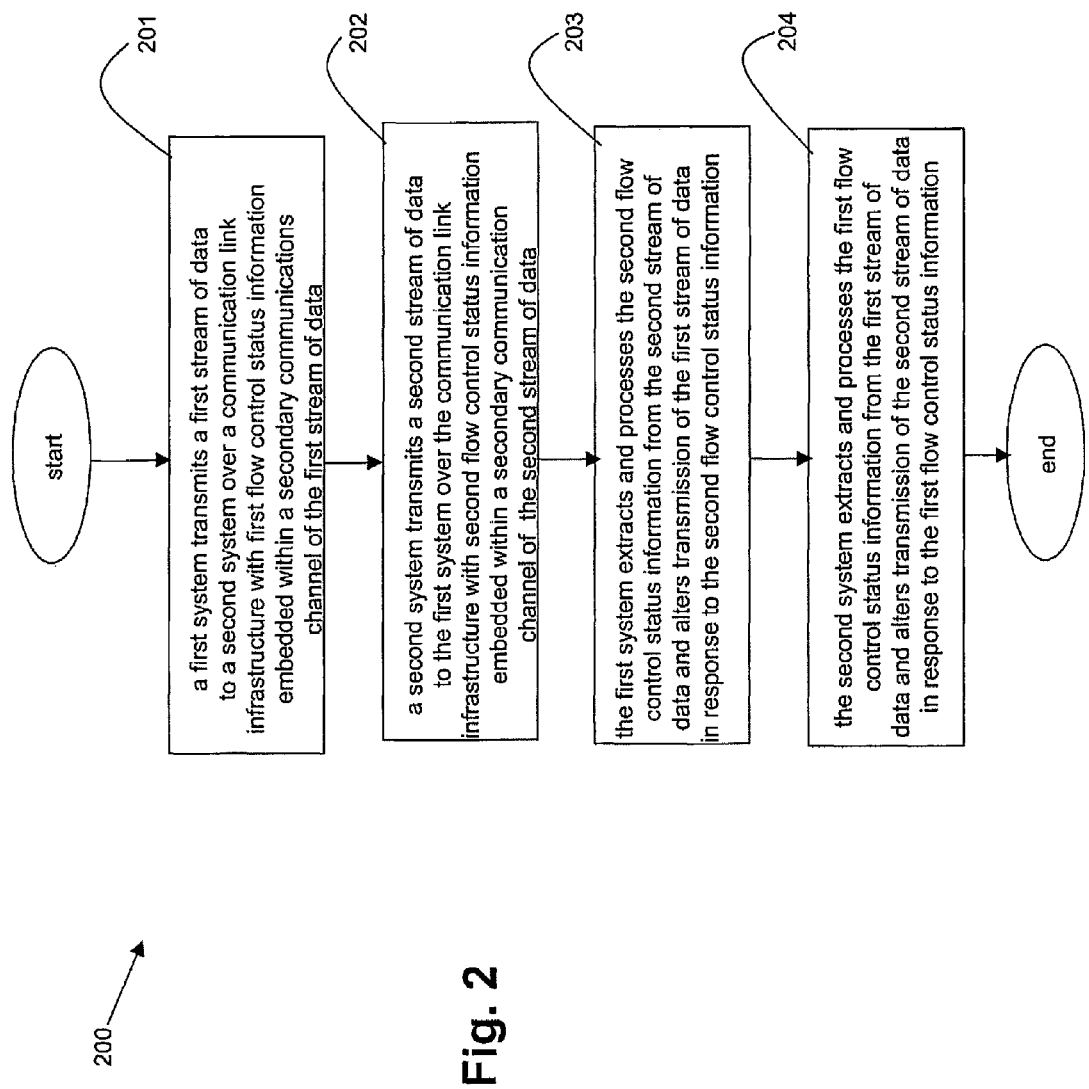
FIG. 2 is a flowchart illustrating an embodiment of a method providing word-level flow control in a communication system using a secondary communication channel, in accordance with various aspects of the present invention.

FIG. 2 is a flowchart illustrating an embodiment of a method 200 providing word-level flow control in a communication system using a secondary communication channel, in accordance with various aspects of the present invention. In step 201, a first system transmits a first stream of data to a second system over a communication link infrastructure with first flow control status information embedded within the secondary communication channel of the first stream of data. In step 202, a second system transmits a second stream of data to the first system over the communication link infrastructure with second flow control status information embedded within the secondary communication channel of the second stream of data. In step 203, the first system extracts and processes the second flow control status information from the second stream of data and alters transmission of the first stream of data in response to the second flow control status information. In step 204, the second system extracts and processes the first flow control status information from the first stream of data and alters transmission of the second stream of data in response to the first flow control status information.

As used herein, a secondary communication channel refers to any normally unutilized bandwidth in a communication link between at least two systems such as, for example, an in-band overlay communication channel as described in provisional application No. 60/446,894 filed on Feb. 12, 2003 which is incorporated herein by reference, or a secondary communication channel in a multi-lane communication channel as described in provisional application No. 60/448,703 filed on Feb. 18, 2003 which is incorporated herein by reference. 8B10B encoding and running disparity strategies may be used to communicate the flow control status information.

In accordance with an embodiment of the present invention, the flow control status information may comprise several bits of information that indicate how close a receiving system's buffer is to becoming full. The corresponding transmitting system may employ an algorithm to determine whether or not to proceed with transmitting a next frame of data based on the bits of information. Alternatively, the flow control status information from a receiving system may simply indicate to the corresponding transmitting system to stop or start transmitting. In that embodiment, the secondary channel may emulate the signaling associated with RS-232 compliant interfaces such as RTS/CTS signaling.

Aspects of the invention may include encoding a portion of at least one or more packets in a datastream. The coded word may be the first data word. A running disparity of the encoded word may be reversed. Hence, if an encoded running disparity of an encoded word is RD positive RD(+), then the running disparity is reversed to RD negative RD(−). Similarly, if an encoded running disparity is RD negative RD(−), then the running disparity is reversed to RD positive RD(+). The word may be a data word, control word or an idle word corresponding to a data packet, a control packet and an idle packet, respectively and may appear at any or multiple positions in the data packet.

Figure 3:
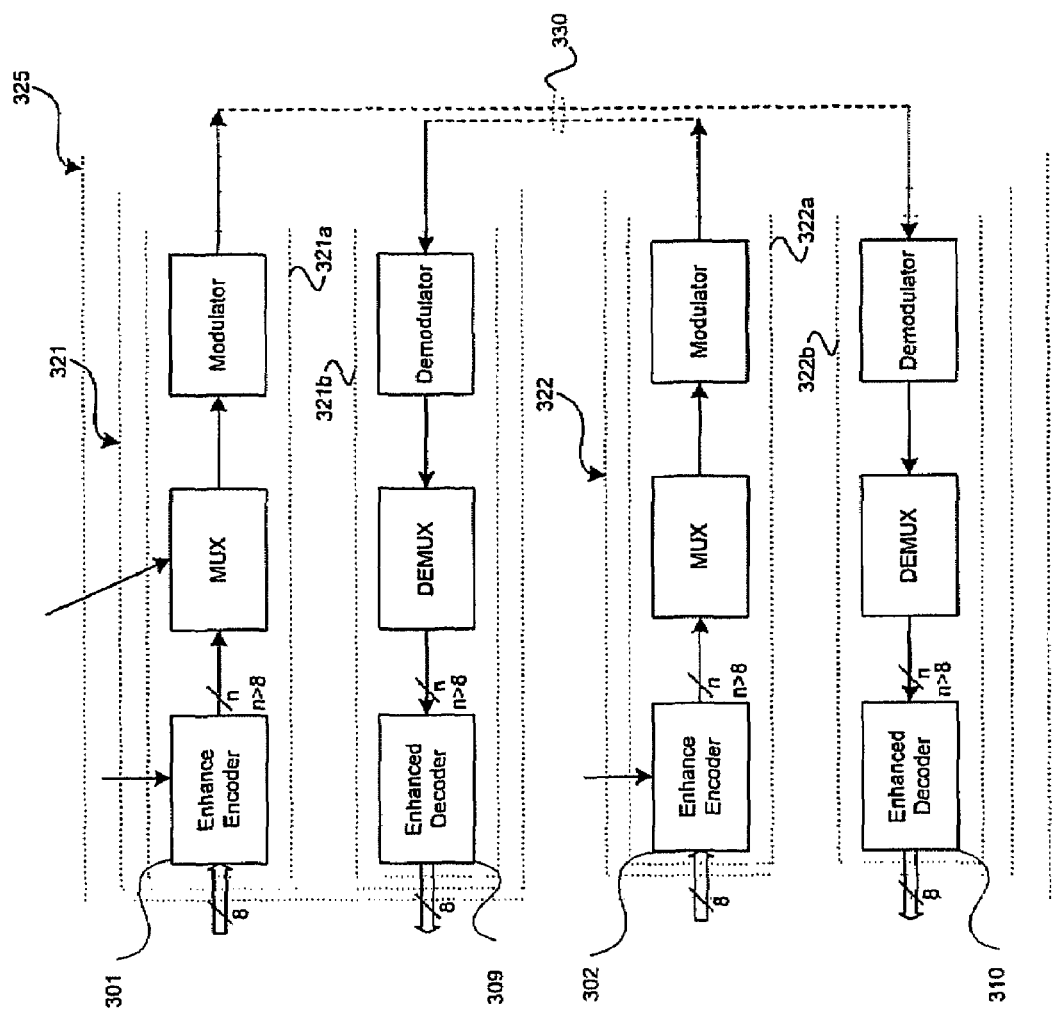
FIG. 3 is a block diagram of a full duplex system in accordance with an embodiment of the invention.

FIG. 3 shows a full duplex system useful for an embodiment of this invention 8 bit data is coded into a suitable transmittable format by enhanced coders 301 and 302. Embedded data can be recovered by enhanced decoders 309, 310 as described more fully below.

Figure 4:
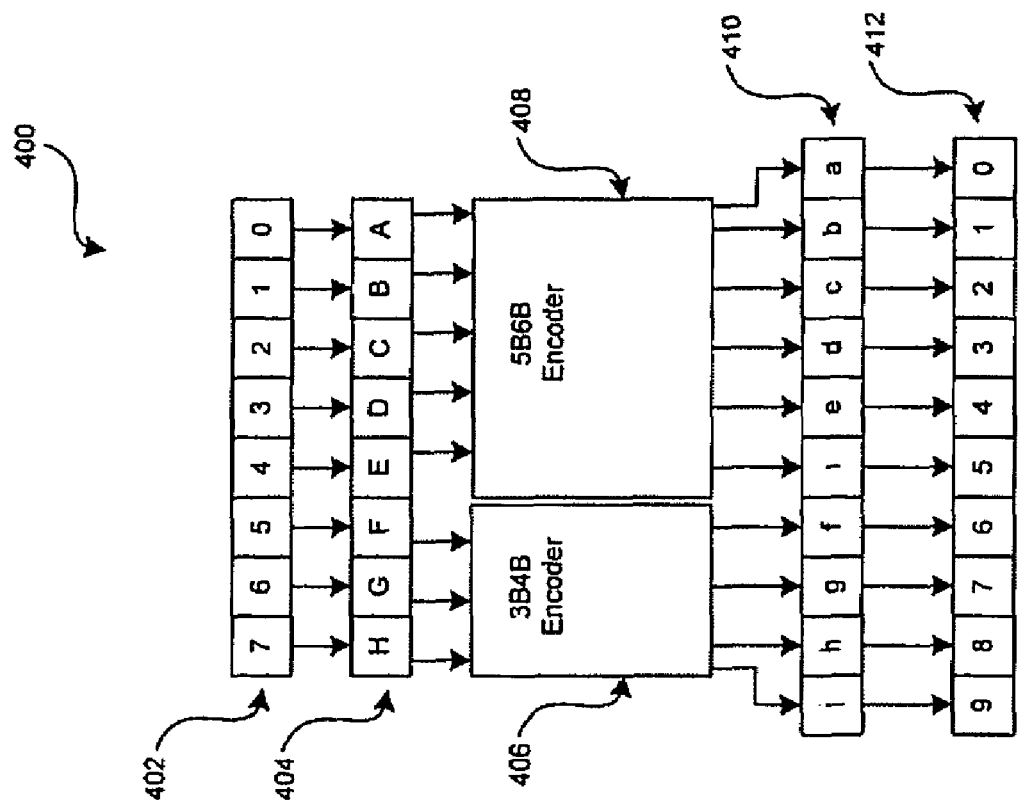
FIG. 4 is an encoder system that may be utilized for generating standardized 8B/10B encoding as illustrated in the table above.

FIG. 4 shows a typical coding scheme, where 8 bits of data 402 are converted by a 3B4B/5B6B coder 406, 408 into a 10 bit coded word 412.

Figure 5:
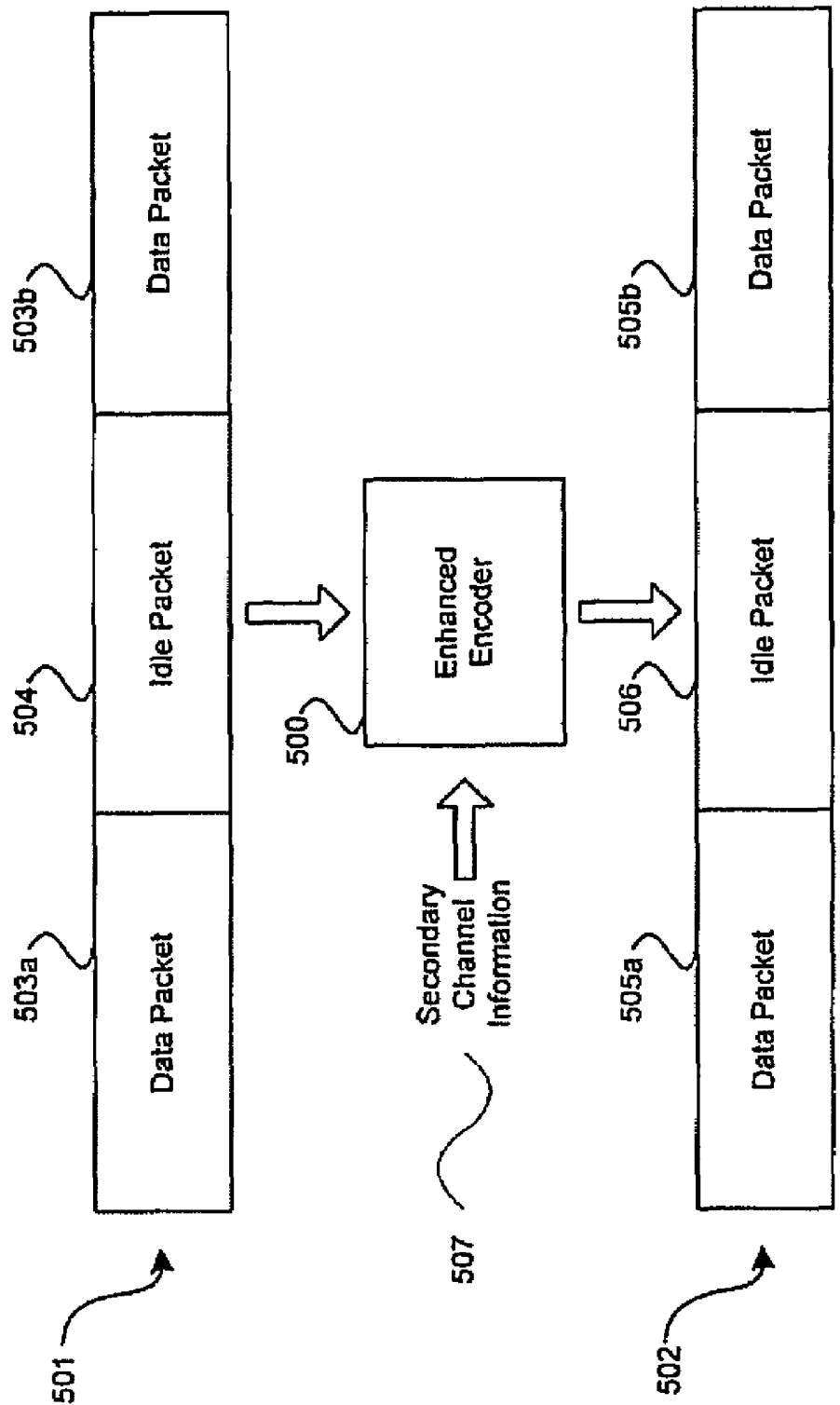
FIG. 5 is a block diagram illustrating encoding data packets and idle packets in accordance with an embodiment of the invention.

FIG. 5 is a block diagram illustrating encoding data packets and idle packets in accordance with an embodiment of the invention. Referring to FIG. 5, there is shown a stream of unencoded packets 501, an enhanced encoder block 500 and a stream of enhanced encoded packets 502. The stream of unencoded packets 501 may include a first unencoded data packet 503a, a second unencoded data 503b and an unencoded idle packet 504. The stream of encoded packets 502 may include a first encoded data packet 505a, a second encoded data 505b and an encoded idle packet 506, and are also shown.

The unencoded idle packet 504 may be located between first unencoded data packet 503a and the second unencoded data packet 503b. The first unencoded data packet 503a may include a block or plurality of unencoded data packets and the second unencoded data packet may also include a block or plurality of unencoded data plackets. Similarly, the unencoded idle packet 504 may include a block or plurality of unencoded idle packets. The unencoded idle packet 504 may be an unencoded inter-packet gap (IPG).

The encoded idle packet 506 may be located between encoded first data packet 505a and the second encoded data packet 505b. The first encoded data packet 505a may include a block or plurality of encoded data packets and the second encoded data packet 505b may also include a block or plurality of encoded data packets. Similarly, the encoded idle packet 506 may include a block or plurality of encoded idle packets. The encoded idle packet 506 may be an encoded inter-packet gap (IPG), for example.

The unencoded first and second data packets 503a, 503b may include a stream or block of unencoded data bytes in which each of the data bytes contain eight (8) bits for each data byte. The unencoded idle packet 504 may also include a stream or block of unencoded idle bytes in which each of the idle bytes contain eight (8) bits for each idle byte. Other packet sizes may also be utilized.

In accordance with an embodiment of the invention, a stream of unencoded packets 501 may be encoded according to an enhanced encoding method employed by the enhanced encoder 500 to form a resultant stream of enhanced encoded packets 502. The stream of enhanced encoded packets 502 produced by the enhanced encoding method employed by the enhanced encoder 500 may include alternating encoded data packets 505a, 505b and encoded idle packets 506. The enhanced encoding method employed by the enhanced encoder 500 may encode data bytes and/or idle bytes according to the rules utilized for generating running disparity, except that certain resultant encoded words within certain encoded packets may be forced to the opposite running disparity of what they normally would be. In other words, if a particular next encoded word would normally be taken from the RD(+) column of an encoding table, it may instead be forced to be taken from the RD(−) column of the encoding table based on secondary channel information 507 provided to the enhanced encoding method 500.

Figure 6:
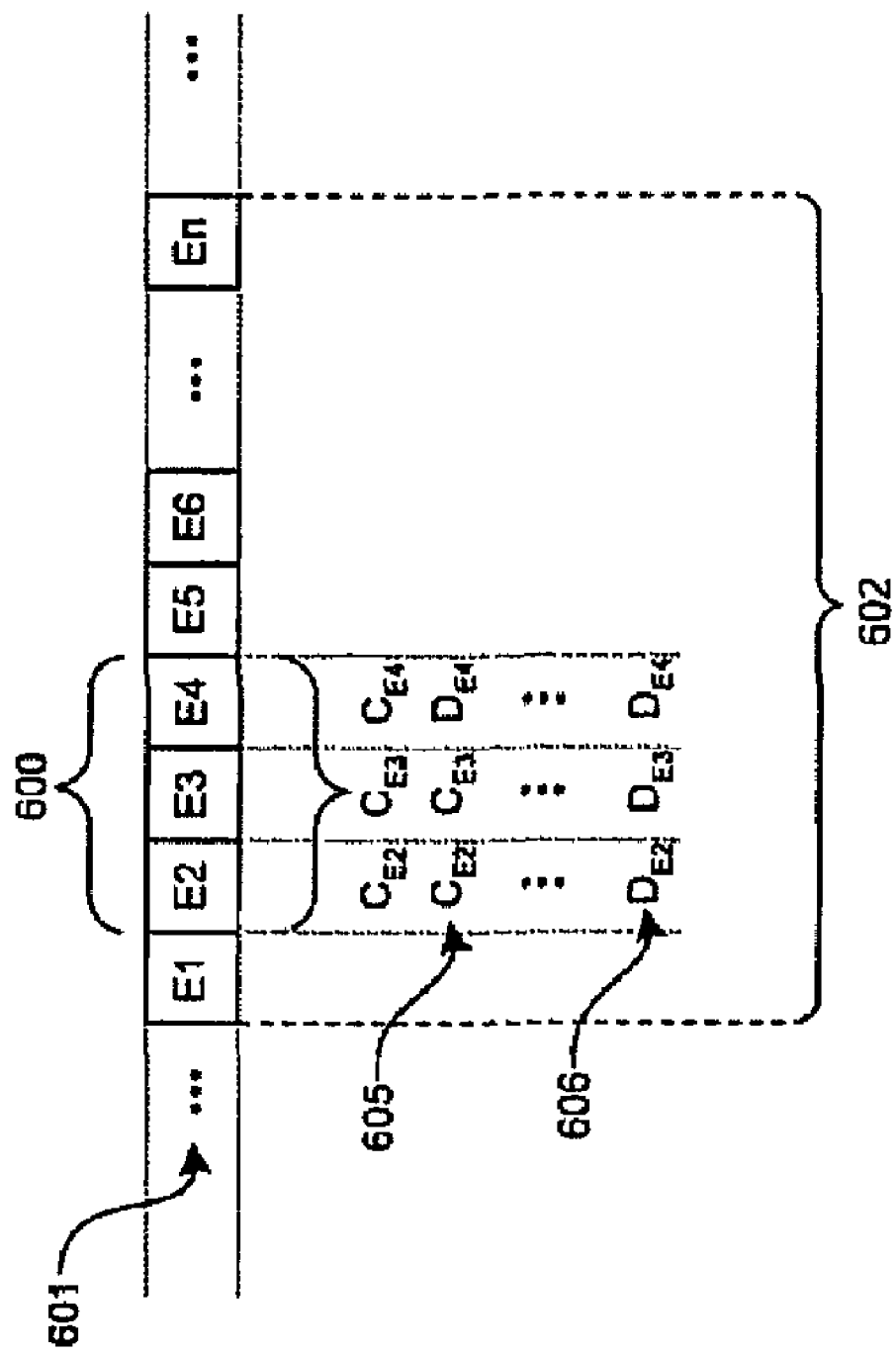
FIG. 6 is a diagram illustrating the overlaying of a secondary communication channel onto a primary communication channel utilizing the enhanced encoding of FIG. 5, in accordance with an embodiment of the invention.

FIG. 6 is a diagram illustrating the overlaying of a secondary communication channel 600 onto a primary communication channel 601 utilizing the enhanced encoding of FIG. 5, in accordance with an embodiment of the invention. Referring to FIG. 6, there is shown a portion of a data stream comprising a data packet 602 for a primary communication channel 601. The data packet 602 may include a plurality of encoded data words E1, E2, E3, E4, E5, E6 . . . , En. In this regard, data packet 602 in the primary communication channel 601 may comprise n encoded data words E1 to En. The encoded data words E2, E3, E4 may form the secondary communication channel 600. The secondary communication channel 600 is overlaid onto the primary communication channel 601 and may be referred to as an overlaid channel.

During normal encoding, each encoded data word in the encoded data packet 602 of the primary communication channel 601 will have a certain running disparity RD(+) or RD(−). In general, the enhanced encoding method utilized by the enhanced encoder 500 may utilize n data words where n may be greater than or equal to one (1). In another aspect of the invention, n may be less than one (1) representing enhanced coding of at least a portion of a data word. In this regard, more than a portion of one (1) data word may also be enhanced encoded in accordance with various embodiments of the invention.

Notwithstanding, the enhanced encoding method utilized by the encoder 500 may utilize, for example, three (3) encoded data words such as E2, E3, E4 in the encoded data packet 602 to create the secondary communication channel 600. In this case, n is equal to three (3). The enhanced encoding method employed by the encoder 300 may switch, reverse or change at least one of the three encoded data words E2, E3, E4 to the opposite running disparity based on the secondary channel information 507. In this regard, for example, if E4 of the current data packet was to come from the RD(+) column of the encoding table according to the conventional encoding scheme, the enhanced encoding method may force E4 to come from the RD(−) column instead, in order to encode secondary channel information 507 onto the primary communication channel 601.

As a result, by forcing E2, E3, and/or E4 to the opposite of the expected running disparity, a secondary information channel 600, which may be represented by three (3) bits of information has been created. Since the running disparity of any encoded data word may be either RD(+) or RD(−), the secondary channel of three (3) data bits representing the enhanced encoded data words allows $2^n-1$ additional pieces of information to be encoded. In this case, n is equal to three (3) and $2^3-1$ or seven (7) additional pieces of information may be encoded. As a result, three additional bits are required to represent the additional enhanced encoded words.

Alternatively, the secondary channel may be formed by coding one or more data words at regular intervals. For example, the secondary channel could be formed by enhanced coding of three consecutive data words starting with the predetermined data word, such as the first word. For example, if the interval as selected as 64, words $E_1$, $E_2$, $E_3$ word form the first coded information and words $E_{65}$, $E_{66}$, and $E_{67}$ would form the second coded information. Any pattern that could be predicted by the receiving enhanced decoder could be used.

Referring to FIG. 6, the correct running disparity may be represented by C. Accordingly, conventional encoding of E2 would result in a corresponding running disparity of $C_{E2}$, conventional encoding of E3 would result in a corresponding running disparity of $C_{E3}$, and conventional encoding of E4 would result in a corresponding running disparity of $C_{E4}$. Enhanced encoding of E2 would result in a corresponding running disparity of $D_{E2}$, enhanced encoding of E3 would result in a corresponding running disparity of $D_{E3}$, and enhanced encoding of E4 would result in a corresponding running disparity of $D_{E4}$. Reference 605 illustrates E4 being reversed to an opposite running disparity $D_{E4}$. In this case, the single enhanced data word may result in the creation of a primary channel that may provide two additional pieces of information.

Similarly, reference 606 illustrates E2 being reversed to an opposite running disparity $D_{E2}$, E3 being reversed to an opposite running disparity $D_{E3}$, and E4 being reversed to an opposite running disparity $D_{E4}$. In this case all three (3) enhanced data words may result in the creation of a primary channel that may provide seven (7) additional pieces of information. The seven (7) additional pieces of information may require three (3) additional bits of information for encoding. The table below illustrates exemplary bit arrangements that may be utilized to represent the data words that may be generated.

|   | E2 | E3 | E4 |
|---|---|---|---|
| 1 | $C_{E2}$ | $C_{E3}$ | $C_{E4}$ |
| 2 | $C_{E2}$ | $C_{E3}$ | $D_{E4}$ |
| 3 | $C_{E2}$ | $D_{E3}$ | $C_{E4}$ |
| 4 | $C_{E2}$ | $D_{E3}$ | $D_{E4}$ |
| 5 | $D_{E2}$ | $C_{E3}$ | $C_{E4}$ |
| 6 | $D_{E2}$ | $C_{E3}$ | $D_{E4}$ |
| 7 | $D_{E2}$ | $D_{E3}$ | $C_{E4}$ |
| 8 | $D_{E2}$ | $D_{E3}$ | $D_{E4}$ |

The first entry (1) in the table may represent the correct encoding resulting from conventional encoding. The remaining entries two (2) through eight (8) represents at least one bit for at least one data word having a reversed or changed running disparity. Entry eight (8) illustrates a scenario in which all three (3) bits represent a running disparity of all three (3) data words being reversed. For example, 605 shows the coding for row 2 in the table.

The three (3) additional bits of information provided by the secondary channel 600 may represent certain system overhead information such as routing table information or flow control information. Other status or system information may be encoded into the secondary channel as well. The receiver side of the digital communication link will also need to know how to properly decode the secondary communication channel, interpreting data words having reversed running disparity as additional encoded information and not as errors. In this regard, the receiver side may require an enhanced decoder for enhanced decoding of the words that have reversed running disparity. In this regard, the receiver side may be capable of calculating the expected running disparity of the next encoded word received. If the actual running disparity of the next received encoded word turns out to be the opposite of what is expected, then the receiver side may interpret this as additional information and not as an error.

Certain error detection performance may be traded off in order to add the secondary communication channel. However, the enhanced encoding method utilized by the enhanced encoder 500 may be designed so that a required error specification may still be met while still providing an efficient secondary communication channel. Accordingly, some of the possible data words that may be generated by the enhanced encoding method utilized by the enhanced encoder 500 may not be utilized.

Figure 7:
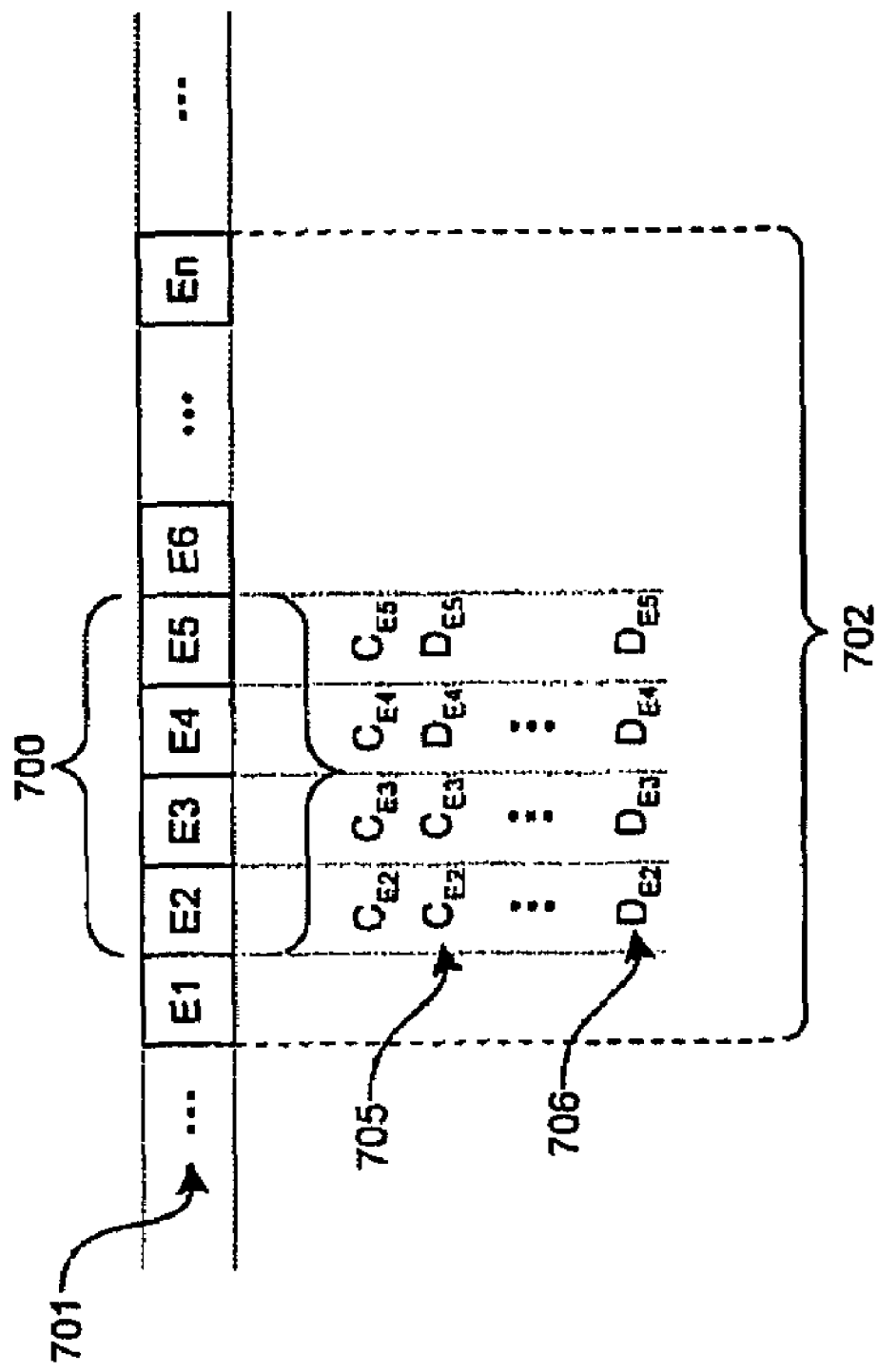
FIG. 7 is a diagram illustrating the overlaying of a secondary communication channel onto a primary communication channel utilizing the enhanced encoding of FIG. 5, in accordance with an embodiment of the invention.

In accordance with various embodiments of the invention, the secondary channel may not be limited to three bits of information. Accordingly, fewer that three, for example two (2), or greater than three (3), for example five (5), encoded data words may be utilized to form a secondary communication channel in the primary communication stream. FIG. 7 is a diagram illustrating the overlaying of a secondary communication channel 700 onto a primary communication channel 701 utilizing the enhanced encoding of FIG. 5, in accordance with an embodiment of the invention. FIG. 7 is similar to FIG. 6, except that FIG. 7 utilizes four (4) data words for the secondary communication channel 700. Data packet 702 may include E1, E2, E3, E4, E5, E6, . . . En.

Referring to FIG. 7, as in FIG. 6, the correct running disparity is represented by C. Accordingly, conventional encoding of E2 would result in a corresponding running disparity of $C_{E2}$, conventional encoding of E3 would result in a corresponding running disparity of $C_{E3}$, conventional encoding of E4 would result in a corresponding running disparity of $C_{E4}$ and conventional encoding of E5 would result in a corresponding running disparity of $C_{E5}$. Enhanced encoding of E2 would result in a corresponding running disparity of $D_{E2}$ and enhanced encoding of E3 would result in a corresponding running disparity of $D_{E3}$, Similarly, enhanced encoding of E4 would result in a corresponding running disparity of $D_{E4}$ and enhanced encoding of E5 would result in a corresponding running disparity of $D_{E5}$. Reference 705 illustrates E4 and E5 being reversed to an opposite running disparity $D_{E4}$ and $D_{E5}$. In this case, the single enhanced data word may result in the creation of a primary channel that may provide two additional pieces of information.

In a similar manner, reference 706 illustrates E2 being reversed to an opposite running disparity $D_{E2}$, E3 being reversed to an opposite running disparity $D_{E3}$, E4 being reversed to an opposite running disparity $D_{E4}$ and E5 being reversed to an opposite running disparity $D_{E5}$. In this case, all four (4) enhanced data words may result in the creation of a primary channel that may provide fifteen (15) or ($2^4-1$) additional pieces of information. Four (4) bits are therefore utilized for encoding to represent the additional fifteen (15) pieces of information. The table below illustrates exemplary bit arrangements that may be utilized to represent the data words that may be generated.

|    | E2       | E3       | E4       | E5       |
|----|----------|----------|----------|----------|
| 1  | $C_{E2}$ | $C_{E2}$ | $C_{E3}$ | $C_{E5}$ |
| 2  | $C_{E2}$ | $C_{E2}$ | $C_{E3}$ | $D_{E5}$ |
| 3  | $C_{E2}$ | $C_{E2}$ | $D_{E3}$ | $C_{E5}$ |
| 4  | $C_{E2}$ | $C_{E2}$ | $D_{E3}$ | $D_{E5}$ |
| 5  | $C_{E2}$ | $D_{E2}$ | $C_{E3}$ | $C_{E5}$ |
| 6  | $C_{E2}$ | $D_{E2}$ | $C_{E3}$ | $D_{E5}$ |
| 7  | $C_{E2}$ | $D_{E2}$ | $D_{E3}$ | $C_{E5}$ |
| 8  | $C_{E2}$ | $D_{E2}$ | $D_{E3}$ | $D_{E5}$ |
| 9  | $D_{E2}$ | $C_{E2}$ | $C_{E3}$ | $C_{E5}$ |
| 10 | $D_{E2}$ | $C_{E2}$ | $C_{E3}$ | $D_{E5}$ |
| 11 | $D_{E2}$ | $C_{E2}$ | $D_{E3}$ | $C_{E5}$ |
| 12 | $D_{E2}$ | $C_{E2}$ | $D_{E3}$ | $D_{E5}$ |
| 13 | $D_{E2}$ | $D_{E2}$ | $C_{E3}$ | $C_{E5}$ |
| 14 | $D_{E2}$ | $D_{E2}$ | $C_{E3}$ | $D_{E5}$ |
| 15 | $D_{E2}$ | $D_{E2}$ | $D_{E3}$ | $C_{E5}$ |
| 16 | $D_{E2}$ | $D_{E2}$ | $D_{E3}$ | $D_{E5}$ |

The first entry (1) in the table may represent the correct encoding resulting from conventional encoding. The remaining entries, two (2) through sixteen (16) represents at least one bit for at least one data word having a reversed or changed running disparity. Entry sixteen (16) illustrates a scenario in which all four (4) bits represents a running disparity of all four (4) data words being reversed. Accordingly, a secondary channel 700 comprising four bits of information overlays the primary channel 701.

In an embodiment of the invention, the secondary communication channel may be dynamic. In this regard, the number of data words encoded in the secondary communication channel may change from packet to packet. For example, a first packet containing a secondary communication channel may utilize three (3) data words or bits, a second packet containing a secondary communication channel may utilize five (5) bits, and a third packet containing a secondary communication channel may use two (2) bits. Each packet may communicate a different type of information about the system on its secondary communication channel.

Although data packets are utilized to illustrate the enhanced encoding employed by the enhanced encoder, the invention is not limited in this regard. Accordingly, data packets, control packets and/or idle packets may be used to encode a secondary communication channel. Additionally, not every packet in the primary communication channel stream may be encoded with a secondary channel. As a result, various levels of tradeoffs may be made between various performance parameters including, for example, DC balance, error detection, transitions and/or additional information transmitted. Although 8B10B encoding is utilized to illustrate various aspects of the enhanced encoding performed by the enhanced encoder 500, the enhanced encoding method 500 may be based on other encoding schemes that use running disparity, in accordance with various embodiments of the present invention. For example, 3B4B and 5B6B encoding schemes may also utilize and benefit from the enhanced encoding method provided by the enhanced encoder 500.

Figure 8:
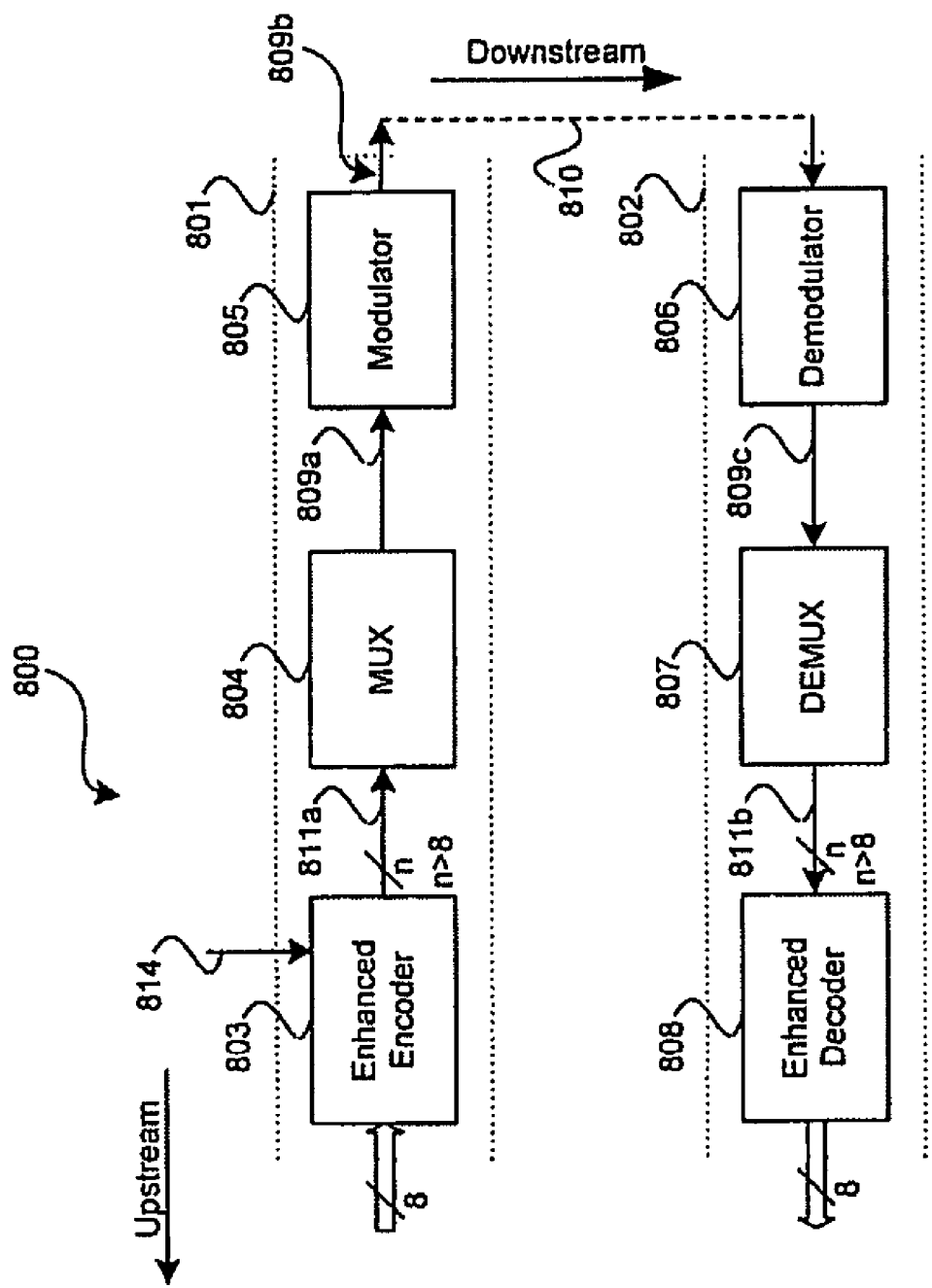
FIG. 8 is a block diagram of a system for overlaying a secondary communication channel on an encoded primary communication channel in accordance with an embodiment of the invention.

FIG. 8 is a block diagram of a system for overlaying a secondary communication channel on an encoded primary communication channel in accordance with an embodiment of the invention. Referring to FIG. 8, there is shown a communication link 800 illustrating an exemplary communication link 800 having a transmitter side 801 and a receiver side 802. The transmitter side 801 may include an enhanced encoder 803, a multiplexer (MUX) 804, and a modulator 805. The receiver side 802 may include a demodulator 806, a demultiplexer (DEMUX) 807, and an enhanced decoder 808. The transmitter side 801 and the receiver side 802 may be coupled by a link infrastructure 810. Alternatively, the link infrastructure may be a loopback path. If the transmitter side 801 is integrated within receiver side 802 in a single chip for example, the loopback may be internal. Otherwise, the loopback may be external. Notwithstanding, the link infrastructure 810 may be, for example, shielded twisted pair, unshielded twisted pair (UTP), copper wire, optical fiber, or wireless.

Typically, the encoder 803 may be adapted to accept raw data bytes from an upstream component or entity of the digital communication system. The raw data bytes may be 8-bit words and may have been previously encrypted by an upstream component or entity of a digital communication system or the communication link 800. Prior encryption of the 8-bit words may ensure data integrity while the encrypted data traverses the digital communication link 800. Notwithstanding, the coded words may be coded in an enhanced manner designed to provide reliable transmission and to more efficiently utilize bandwidth, for example, over the digital communication link 800, in accordance with various embodiments of the invention.

The enhanced encoder 803 may encode each of the 8-bit words into an encoded word having n bits, for example. Generally, n is greater than eight (8) bits (n>8). Encoding the 8-bit words may generally be achieved by translating each 8-bit byte of data into a specially coded word having n bits where n is generally greater than eight (8). The additional (n−8) bits of data provide additional transmission overhead. The increased number of bits resulting from encoding may also provide data redundancy which may be utilized for error detection, for example.

The enhanced encoder 803 may encode at least a portion of at least a first word of one or more packets in a datastream. In this regard, the enhanced encoder 803 may reverse a running disparity of the encoded word. Hence, if an encoded running disparity of an encoded word is RD positive RD(+), then the enhanced encoder 803 reverses the running disparity to RD negative RD(−). Similarly, if an encoded running disparity is RD negative RD(−), then the enhanced encoder 803 reverses the running disparity to RD positive RD(+). The word may be a data word, control word or an idle word corresponding to a data packet, a control packet and an idle packet, respectively.

The enhanced encoder 803 may also assign n bits of information to each word, where n is greater than or equal to 1, thereby generating $2^n-1$ additional enhanced words having reversed running disparities. The words with the running disparity may comprise a secondary channel overlaid on the primary communication channel. The enhanced encoder 803 may control the secondary channel using the n assigned bits. In an aspect of the invention, the enhanced encoder 803 may dynamically change or resize the number of words in a packet utilized for enhanced encoding among various packets during enhanced encoding. Words utilized for enhanced encoding may be randomly selected among the packets by the enhanced encoder 803. The enhanced encoder may receive secondary channel information 814, which may be utilized for controlling the enhanced encoding of words. In this regard, the enhanced encoder may utilize the secondary channel information to control reversal of the running disparity.

Once the raw data bytes have been enhanced encoded by the encoder 803, the resulting coded data 811a may be multiplexed into a serial bitstream 809a by the multiplexer 804. In another embodiment of the invention, the resulting coded data 811a may also be converted a plurality of serial bit streams as in XAUI where 4 parallel lanes are utilized. Notwithstanding, the resulting enhanced multiplexed serial bitstream 809a may subsequently be transferred to the modulator 805 for processing. The modulator 805 may perform digital-to-analog conversion on the enhanced serial bitstream 809a, resulting in an equivalent or corresponding enhanced bitstream 809b. The resulting enhanced analog serial bitstream 809b may be transferred to the receiver side 802 via the link infrastructure 810.

The demodulator 806 on the receiver side 802 may be adapted to receive the enhanced analog serial bitstream 809b transferred from the transmitter side 801. The demodulator 806 may perform an analog-to-digital conversion on the received enhanced serial bitstream 809b, resulting in an enhanced serial digital bitstream 809c. The resulting enhanced serial digital bitstream 809c generated by the demodulator 806 may be transferred to the demultiplexer 807 for processing. The demultiplexer 807 may be configured to demultiplex the enhanced serial digital bitstream 809c by executing the opposite of the multiplexing function performed by multiplexer 804.

The demultiplexer 807 may translate the enhanced serial bitstream 809c back into an enhanced datastream 811b containing enhanced n-bit coded words. For example, in the case of gigabit Ethernet, the demultiplexer 807 may translate the serial bitstream 809c back into enhanced 10-bit coded words. The n-bit enhanced coded words produced by the demultiplexer 807 may subsequently be transferred to the enhanced decoder 608 for processing. The enhanced decoder 808 may be adapted to execute the opposite of the enhanced encoder function performed by the enhanced encoder 803. In this regard, the enhanced decoder 808 may convert the n-bit coded words back into 8-bit unencoded bytes. The enhanced decoder 808 may receive at least an encoded portion of a packet having a reversed disparity and a determination made as to whether the disparity has been reversed. Upon determining that the disparity has been reversed, the enhanced decoder may reverse the disparity. These 8-bit unencoded bytes, if previously encrypted, may be decrypted by an upstream component of the digital communication link 800, for example.

The arrangements of FIG. 8 illustrates a half-duplex mode of operation. However, the invention is not limited in this regard and may be similarly applicable to a full-duplex mode of operation. FIG. 3 is a block diagram of the exemplary system of FIG. 8 illustrating a duplex configuration in accordance with an embodiment of the invention. Each side of the digital communication link may include a transceiver having a transmitter side and a receiver side, operating in full duplex mode. In this regard, each of the transceivers many simultaneously transmit and receive data.

Referring to FIG. 3, there is shown a first transceiver block 321 and a second transceiver block 322. The first transceiver block 321 may include a transmitter block 321a and a receiver block 321b. The second transceiver block 322 may include a transmitter block 322a and a receiver block 322b. The transmitter block 321a of first transceiver block 321 and the transmitter block 322a of the second transceiver block 322 may be configured to operate in a manner similar to the transmitter side 801 of FIG. 8. Similarly, the receiver block 321b of first transceiver block 321 and the receiver block 322b of the second transceiver block 322 may be configured to operate in a manner similar to the receiver side 302 of FIG. 8. The link infrastructure 330 may couple the transmitter block 321a to receiver block 322b and transmitter block 322a to receiver block 321b.

In accordance with an embodiment of the present invention, flow control status information may be used to control the flow of data from a transmitting system at the word level in real time. Since the flow control status information is embedded in the normal communication channel using a secondary communication channel, the flow control status information is being communicated in real time as part of normal communications. Flow control can be accomplished without special hardware signals or control message protocols. Instead, a system may react to the flow control status information in real time by stopping and starting the transmission of individual data words. Two systems operating in full duplex mode do not need to wait for each other to first finish transmitting whole frames of data before communicating flow control status information to each other.

A number of different strategies may be employed using the secondary channel to convey flow control information. For example, flow control could be implemented by reversing the running disparity in every word transmitted from the second system until the first system stops sending. Alternatively, additional information about the state of the transmit or receive buffers can be conveyed by combining 2 or more words and detecting reversed running disparity. For example, a running disparity of normal, normal, reversed, normal may indicate a receiver buffer state of 0010 or "2" of 0-15 possible states. The buffer state may be detected by repeating the pattern every four words or at some other interval.

In an alternate arrangement, the running disparity may be examined for a reversal only on every $N^{th}$ word, where N is relatively small compared to the number of words in the largest frame. A series of $N^{th}$ words may be examined to detect a larger number of potential states for the buffer. Another arrangement may be to examine for a reversed running disparity at a predetermined interval and treat for resulting bit stream as a low bit rate, in band digital signaling channel.

Alternately, the pattern of reversals, or lack of reversals, may correspond to other flow control signals besides buffer status, such as device not ready or synchronization lost.

In summary, a method provides flow control in a communication system using a secondary communication channel. Flow control status information of a first system may be embedded in the secondary communication channel of a communication channel and communicated to another system in real time as part of normal communications. A system can react to the flow control status information in real time and control transmission of data at the word level.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of providing word-level flow control in a communication system, comprising:
    establishing a bi-directional communications link between a first system and a second system;
    transmitting a frame of data from said first system to said second system; and
    suspending the transmission of the frame of data without waiting for the end of the frame when the first system receives a stop transmission request embedded in a secondary communication channel between the second system and the first system.

2. The method of claim 1, wherein the embedded link data comprises a data word having a reversed running disparity.

3. The method of claim 1, wherein the embedded link data comprises a data word having alternative coding.

4. The method of claim 1, wherein the secondary communication channel comprises start and stop packet codes.

5. The method of claim 1, wherein the secondary communication channel comprises start/stop symbols.

6. The method of claim 1, wherein the transmission is suspended at the end of a word within a frame.

7. The method of claim 1, wherein embedding flow control data in a secondary communication channel of the communications link from the second system to the first system.

8. The method of claim 1, wherein the communications link has at least two lanes.

9. The method of claim 1, wherein the communications link has four lanes.

10. The method of claim 1, comprising embedding flow control data in a secondary communication channel of the communications link from the second system to the first system.

11. A system providing word-level flow control, comprising:
    a controller operably coupled to a full-duplex communication link, wherein said controller includes an encoder that encodes a secondary channel, and a decoder that decodes a received communication channel, wherein said secondary communications channel includes word level coding, and wherein said system stops transmission of data without waiting for the end of a packet in response to word level commands received on said secondary communication channel.

12. The system of claim 11, wherein the word level command is based on reversed running disparity coding.

13. The system of claim 11, wherein the word level command is constructed from a series of alternatively coded words.

14. A method of providing word-level flow control in a communication system, comprising:
    establishing a bi-directional communications link between a first system and a second system;

transmitting a frame of data from said first system to said second system;

suspending the transmission of the frame of data without waiting for the end of the frame when the first system receives a stop transmission request embedded in a secondary communication channel between the second system and the first system; and resuming transmission of the frame with the next word following the receipt of a start transmission code embedded in the secondary communication channel, wherein the secondary communication channel is formed from groups of enhanced coded data words occurring at regular intervals in a data frame.

15. A method of providing word-level flow control in a communication system, comprising:

establishing a bi-directional communications link between a first system and a second system;

transmitting a frame of data from said first system to said second system;

suspending the transmission of the frame of data without waiting for the end of the frame when the first system receives a stop transmission request embedded in a secondary communication channel between the second system and the first system; and resuming transmission of the frame with the next word following the receipt of a start transmission code embedded in the secondary communication channel, wherein the secondary communication channel is formed from individual enhanced coded data words appearing at regular intervals in a data frame.

16. A method of providing word-level flow control in a communication system, comprising:

establishing a bi-directional communications link between a first system and a second system;

transmitting a frame of data from said first system to said second system; and suspending the transmission of the frame of data without waiting for the end of the frame when the first system receives a stop transmission request embedded in a secondary communication channel between the second system and the first system, wherein the embedded flow control data is embedded in said secondary communication channel using a combination of two symbols.

17. A method of providing flow control in a communication system, comprising:

establishing a bi-direction communications link with a remote system;

embedding flow control data in a secondary communication channel of the communications link for use by a primary communication channel of the communications link; and resuming transmission of the frame with the next word following the receipt of a start transmission code embedded in the secondary communication channel, wherein the secondary communication channel is formed from groups of enhanced coded data words occurring at regular intervals in a data frame.

18. A method of providing flow control in a communication system, comprising:

establishing a bi-direction communications link with a remote system;

embedding flow control data in a secondary communication channel of the communications link for use by a primary communication channel of the communications link; and resuming transmission of the frame with the next word following the receipt of a start transmission code embedded in the secondary communication channel, wherein the secondary communication channel is formed from individual enhanced coded data words appearing at regular intervals in a data frame.

19. A method of providing word-level flow control in a communication system, comprising:

establishing a bi-directional communications link between a first system and a second system;

transmitting a frame of data from said first system to said second system;

suspending the transmission of the frame of data without waiting for the end of the frame when the first system receives a stop transmission request embedded in a secondary communication channel between the second system and the first system; and resuming transmission of the frame with the next word following the receipt of a start transmission code embedded in the secondary communication channel.

20. A method of providing word-level flow control in a communication system, comprising:

establishing a bi-directional communications link between a first system and a second system;

transmitting a frame of data from said first system to said second system;

suspending the transmission of the frame of data without waiting for the end of the frame when the first system receives a stop transmission request embedded in a secondary communication channel between the second system and the first system; and resuming transmission of the frame with the next word following the receipt of a start transmission code embedded in the secondary communication channel, wherein the secondary communication channel comprises multiple coded symbols.

21. A method of providing word-level flow control in a communication system, comprising:

establishing a bi-directional communications link between a first system and a second system, wherein the bi-directional communications link conducts flow control without using a special flow control message that is not contained within normal data frames;

transmitting a frame of data from said first system to said second system; and suspending the transmission of the frame of data without waiting for the end of the frame when the first system receives a stop transmission request embedded in a secondary communication channel between the second system and the first system.

22. A method of providing flow control in a communication system, comprising:

establishing a bi-direction communications link with a remote system;

embedding flow control data in a secondary communication channel of the communications link for use by a primary communication channel of the communications link; and resuming transmission of the frame with the next word following the receipt of a start transmission code embedded in the secondary communication channel.

23. A method of providing flow control in a communication system, comprising:

establishing a bi-direction communications link with a remote system;

embedding flow control data in a secondary communication channel of the communications link for use by a primary communication channel of the communications link; and resuming transmission of the frame with the next word following the receipt of a start transmission code embedded in the secondary communication channel, wherein the secondary communication channel comprises multiple coded symbols.

24. A method of providing flow control in a communication system, comprising:
    establishing a bi-direction communications link with a remote system; and
    embedding flow control data in a secondary communication channel of the communications link for use by a primary communication channel of the communications link, wherein the embedded flow control data comprises a data word having a reversed running disparity.

* * * * *